United States Patent [19]

Leatherman

[11] 4,396,737
[45] Aug. 2, 1983

[54] POLYMERIZATION OF POLYOL ALLYL CARBONATE USING POLYMERIZATION INITIATORS OF SHORT AND LONG HALF LIVES

[75] Inventor: Ivan R. Leatherman, Wadsworth, Ohio

[73] Assignee: PPG Industries, Inc., Pittsburgh, Pa.

[21] Appl. No.: 322,823

[22] Filed: Nov. 19, 1981

[51] Int. Cl.³ .............................................. C08F 18/24
[52] U.S. Cl. .................................. 524/176; 526/314;
526/228; 526/213; 526/212; 526/210; 526/208
[58] Field of Search ............... 526/314, 228, 213, 212, 526/210, 208; 524/176

[56] References Cited

U.S. PATENT DOCUMENTS 2,464,062  3/1949  Strain .................................... 260/80
3,013,305  12/1961  deGooreynd ......................... 18/47.5
3,216,958  11/1965  Sheld .................................. 260/23.5
3,654,253  4/1972  Steigerwald et al. ........... 260/94.9 R
3,714,135  1/1973  Pfannimueller et al. .......... 260/86.7
4,129,703  12/1978  Kamath et al. ........................ 526/73
4,311,762  1/1982  Spycher et al. ..................... 423/412

*Primary Examiner*—Joseph L. Schofer
*Assistant Examiner*—Bernard Lipman
*Attorney, Agent, or Firm*—Richard M. Goldman

[57] ABSTRACT

Disclosed is a liquid composition of a polyol(allyl carbonate) monomer; a first, low initiation temperature, short half life, polymerization initiator; and, a second, high initiation temperature, long half life, polymerization initiator. Optionally, a photochromic agent may be present. Also disclosed is a method of polymerizing the composition, and the polymerizate prepared thereby.

33 Claims, No Drawings

400;4,396,737

POLYMERIZATION OF POLYOL ALLYL CARBONATE USING POLYMERIZATION INITIATORS OF SHORT AND LONG HALF LIVES

DESCRIPTION OF THE INVENTION

Polyol(allyl carbonate) polymerizates are characterized by hardness, impact resistance, abrasion resistance, and ability to incorporate photochromic additives. However, polymerizates of polyol(allyl carbonates) containing photochromic additives are characterized by fatigue, that is, persistence of the dark color. Moreover, increased hardness, impact resistance, and abrasion resistance are always desirable.

It has now been found that the fatigue of photochromic polyol(allyl carbonate) polymerizates may be alleviated, and the ultimate physical properties enhanced if the polyol(allyl carbonate) monomer is polymerized in the presence of a first, low initiation temperature, short half life polymerization initiator, and a second, high initiation temperature, long half life polymerization initiator.

DETAILED DESCRIPTION OF THE INVENTION

A polyol(allyl carbonate) polymerizate having enhanced resistance to photochromic fatigue may be prepared by polymerizing a liquid composition of polyol(allyl carbonate) monomer, the photochromic agent, a first, low initiation temperature, short half life, polymerization initiator, and a second, high initiation temperature, long half life organic peroxide polmerization initiator. The polymerization is carried out at temperatures that avoid initiation of the second, high initiation temperature, long half life, organic peroxide polymerization initiator.

A polyol(allyl carbonate) polymerizate having enhanced ultimate properties, i.e., enhanced impact strength, enhanced Barcol hardness, and enhanced abrasion resistance, may be prepared by polymerizing a liquid composition of polyol(allyl carbonate) monomer, the photochromic agent, a first, low initiation temperature, short half life polymerization initiator, and a second, high initiation temperature, long half life, polymerization initiator. The polymerization is preferably carried out as a two stage polymerization, to sequentially initiate polymerization by the first polymerization initiator and by the second polymerization initiator.

A polyol(allyl carbonate) polymerizate having enhanced resistance to photochromic fatigue, and enhanced ultimate physical properties may be prepared by polymerizing a liquid composition of (1) a polyol(allyl carbonate) monomer, (2) a first, short half life, low initiation temperature, polymerization initiator, (3) a second, moderate half life, moderate initiation temperature, polymerization initiator, and (4) a third, long half life, high initiation temperature, organic peroxide polymerization initiator. The polymerization is carried out under conditions such that initial polymerization is initiated by the first, short half life, low initiation temperature polymerization initiator, and subsequent post-cure is carried out at temperatures high enough to activate the second, moderate half life, moderate initiation temperature polymerization initiator, but low enough to avoid initiation by or activation of the third, long half life, high initiation temperature, organic peroxide polymerization initiator.

According to one exemplification, the provision of two peroxy polymerization initiators enhances the photochromic properties of the polymerizates. As disclosed in U.S. Pat. No. 4,069,168 of I. R. Leatherman et al, tungsten hexacarbonyl $W(CO)_6$ may be incorporated in liquid polyol(allyl carbonates) or solid polyol(allyl carbonate) in order to produce photochromic liquids and polymerizates, e.g., lenses, sheets, or other shapes which are optically clear and substantially haze-free, are initially water-white, display a desirable photochromic color shift to blue in response to daylight, have substantial infrared absorbance in the blue state, and have a reasonable service life. By "substantial infrared absorbance" is meant absorbance in the infrared region at least as great as the average absorbance in the visible region.

Tungsten hexacarbonyl is a known compound which is available on the market. Methods of preparation appear in the literature. See, for example, U.S. Pat. Nos. 1,894,239 and 1,921,536.

It has further been reported that other transition metal compounds exhibit photochromic activity when incorporated into polymerizates. That is, they are capable of reversible, light induced, color and light transmission changes. For example, chromium complexes, tungsten complexes, cobalt complexes, molybdenum complexes, iridium complexes, rhenium complexes, and the like. Most commonly the complexes are carbonyls, arenes, $NH_3$, $NO_2$ or $CN$. Various mechanisms have been postulated for the photochromism of transition metal complexes contained within organic polymerizates, e.g., unimolecular ligand disassociation, unimolecular ligand isomerization, unimolecular reductive elimination, metal-metal bond cleavage, unimolecular rearrangements, bimolecular electron transfers, bimolecular proton transfers, bimolecular energy transfers, and bimolecular ligand addition. Most commonly the photochromism is believed to be unimolecular ligand disassociation, unimolecular ligand isomerization, or a redox reaction.

While the exact mechanism is not fully understood, it is believed that the presence of residual peroxides lowers the activation energy for return to the non-excited state. In this regard it has now been found that the presence of peroxide, e.g., organic peroxide polymerization initiator, under conditions where the peroxide is believed to be resident peroxide, i.e., peroxide, that has not initiated or otherwise taken part in the polymerization reaction, enhances the recovery of the photochromic polymerizate and reduces the photochromic fatigue thereof.

The amount of organic peroxide necessary to enhance photochromic recovery, or to reduce photochromic fatigue, or to both enhance photochromic recovery and reduce photochromic fatigue is from about 1 mole of peroxide per equivalent of photochromic agent to about 10 moles of peroxide per equivalent of photochromic agent.

According to one exemplification herein contemplated, a liquid composition is prepared containing a photochromic amount of a transition metal-ligand photochromic material in a liquid polyol (allyl carbonate), e.g., a liquid composition containing from about 0.01 to about 1.0 weight percent tungsten hexacarbonyl in diethylene glycol bis(allyl carbonate). The organic peroxides may be added to the composition, or only the high ignition temperature, long half life organic peroxide polymerization initiator may be added to the composition, with the short half life, long ignition temperature organic peroxide added immediately prior to polymerization. A photochromic recovery enhancing amount of the second, high ignition temperature, long half life organic peroxide may be added to composition, for example, from about 0.1 to about 3 weight percent t-butyl peroxyisopropyl carbonate, t-butylperoxy acetate, t-butyl hydroperoxide, or the like is added to the liquid composition. The resulting composition of organo-metallic photochromic agent and high ignition temperature, long half life organic peroxide initiator in polyol (allyl carbonate) may be sold as an item of commerce. Alternatively, the organic peroxides may be added substantially simultaneously.

The composition is placed in molds, and a polymerization initiating amount of low ignition temperature, short half life organic peroxide polymerization initiator is added thereto, whereby to commence polymerization. The amount of first, low ignition temperature, short half life, organic peroxide polymerization is from about 0.01 mole per mole of monomer to about 0.1 mole per mole of monomer. For example, about 2.5 to about 4.0 weight percent of diisopropyl peroxydicarbonate is added to the composition of tungsten hexa(carbonyl) and, e.g., t-butyl peroxyisopropyl carbonate in diethylene glycol bis(allyl carbonate), in an airtight mold, and heated to above about 40 degrees Centigrade whereby to commence polymerization. The resulting polymerizate is characterized by high Barcol strength, high impact resistance, photochromicity, photochromic recovery, and the relative absence of photochromic fatigue.

According to an alternative exemplification of this invention, low initiation temperature, short half life polymerization initiator and a high initiation temperature, long half life initiator may be present in the monomer, and the system may be heated to temperatures high enough to initiate polymerization by both initiators. That is, initial polymerization or cure may be effected at a low temperature by the first, low initiation temperature, short half life polymerization initiator and, thereafter, a second, or post-cure polymerization, which may be characterized by additional crosslinking, may occur at higher temperatures by the second, high initiation temperature, long half life polymerization initiator.

As herein contemplated, a liquid composition is prepared containing a monomer, i.e., a diol bis(allyl carbonate) such as diethylene glycol bis(allyl carbonate), a polymerization initiating amount of a first, low initiation temperature, short half life polymerization initiator, e.g., 2.5 to 4.5 weight percent diisopropyl peroxydicarbonate, and a polymerization enhancing amount of a second, long half life, high initiation temperature polymerization initiator, e.g., about 1 to 3 or more weight percent benzoyl peroxide. The liquid composition of monomer, first polymerization initiator, and second polymerization initiator is heated to initiate polymerization by the first polymerization initiator, e.g., to about 40 to 100 degrees Centigrade, for about 10 to 24 hours. Thereafter the polymer is post cured, i.e., heated to initiate polymerization by the second polymerization initiator, e.g., to about 100 to 150 degrees Centigrade. In this way there is obtained a polymer characterized by enhanced impact strength, Barcol hardness, and abrasion resistance.

According to a still further exemplification of this invention, there is provided a composition with a photochromic material, and three polymerization initiators, a low temperature polymerization initiator for polymerization, a second, moderate temperature, polymerization initiator for post-cure, and a high temperature, organic peroxide polymerization initiator, which is not initiated, but enhances the photochromic properties, as described hereinabove.

Polyol (allyl carbonates) which may be polymerized by the method herein described, whereby to exhibit enhanced physical properties and photochromic recovery include mono-functional allyl carbonates, diol bis(allyl carbonates), triol tris(allyl carbonates), tetra bis(allyl carbonates), and higher polyol(allyl carbonates).

Diol bis (allyl carbonate) monomers which may be polymerized by the method of this invention are normally linear, liquid allyl carbonates, and, most commonly, are aliphatic diol kis(allyl carbonates) i.e., glycol bis (allyl carbonate) compounds, in which the allyl groups may be substituted at the 2 position with a halogen, notably chlorine or bromine, or a 1 to 4 carbon alkyl group, generally a methyl or ethyl group, and the glycol group may be an alkylene, alkylene ether, alkylene polyether, alkylene carbonate, or alkylene polyether group having from 2 to 10 carbons and oxygens. These diol bis (allyl carbonate) monomers are represented by the formula:

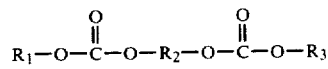

where $R_1$ and $R_3$ are allyl or substituted allyl groups, and $R_2$ is as defined below. $R_1$ and $R_3$ are independently represented by the formula:

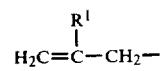

where $R^1$ may be hydrogen, halogen, or a 1 to 4 carbon alkyl group. Specific examples of $R_1$ and $R_3$ include allyl, 2-chloroallyl, 2-bromoallyl, 2-iodoallyl, 2-fluoroallyl, 2-methallyl, 2-ethylallyl, 2-isopropylallyl, 2-n-propylallyl, and 2-n-butylallyl groups. Most commonly, $R_1$ and $R_3$ are allyl groups, $H_2C=CH-CH_2-$. Such compounds and methods for making them are disclosed in U.S. Pat. Nos. 2,370,567 and 2,403,113.

Specific examples of $R_2$ are alkylene groups such as ethylene, trimethylene, methylethylene, tetramethylene, ethylethylene, pentamethylene, hexamethylene, 2-methylhexamethylene, octamethylene, and decamethylene groups, alkylene ether groups such as —CH$_2$—O—CH$_2$—, —CH$_2$CH$_2$—O—CH$_2$CH$_2$—, —CH$_2$—O—CH$_2$—CH$_2$—, and —CH$_2$CH$_2$CH$_2$—O—CH$_2$CH$_2$CH$_2$—, alkylene polyether groups such as —CH$_2$CH$_2$—O—CH$_2$CH$_2$—O—CH$_2$CH$_2$—O—CH$_2$CH$_2$O—CH$_2$CH$_2$—, and —CH$_2$—O—CH$_2$— groups, and alkylene carbonate groups such as CH$_2$CH$_2$—O—CO—O—CH$_2$CH$_2$ and —CH$_2$CH$_2$—O—CH$_2$CH$_2$—O—CO—O—CH$_2$CH$_2$—OCH$_2$CH$_2$— groups. Most commonly, $R_2$ is —CH$_2$CH$_2$— or CH$_2$CH$_2$—O—CH$_2$CH$_2$—.

Specific examples of diol bis (allyl carbonate) monomers useful in carrying out the method herein contemplated include ethylene glycol bis (2-chloroallyl carbonate), diethylene glycol bis (2-methallyl carbonate), triethylene glycol bis (allyl carbonate), propylene glycol bis (2-ethylallyl carbonate), 1,3-propanediol bis (allyl carbonate), 1,3-butanediol bis (allyl carbonate), 1,4-butanediol bis (2-bromoallyl carbonate), dipropylene glycol bis (allyl carbonate), trimethylene glycol bis (2-ethylallyl carbonate), and pentamethylene glycol bis (allyl carbonate).

Commercially important diol bis (allyl carbonate) monomers which may be polymerized by the method herein contemplated are:

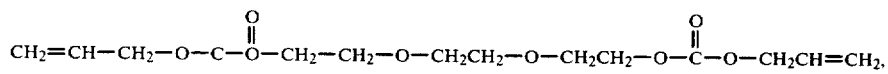

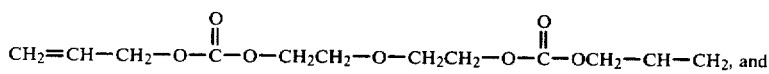

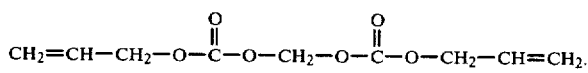

Triol tris(allyl carbonates) which may be polymerized by the method of this invention, either homopolymerized or copolymerized, e.g., with diol bis(allyl carbonates) are represented by the formula

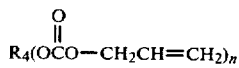

where $R_4$ is an organic moiety chosen from the group consisting of moieties derived from polyols and extended polyols, most frequently a triol or extended triol where the hydroxyl groups of the precursor polyol $R_4(OH)_n$ are non-vicnal.

While the functionality is shown as tris functionality, it is to be understood that in higher polyols n is greater than 2, e.g., above about 2.2, representing a mixture of diols and higher polyols, to about 8 representing a derivative of trimeric pentaerythritol. By "non-vicinal" it is meant that the hydroxyl groups are not on adjacent carbons. Specific triol precursors useful in preparing the tris(allyl carbonate) materials useful in this invention are triols with primary or secondary hydroxyl groups. Triols having primary hydroxyl groups are preferred precursors. One such class of triols are 1,1,1-trimethylol alkanes. Also useful are extended trimethylol alkale tris(allyl carbonate) monomers such as lactone extended trimethylol alkanes and alkyl oxide extended trimethylol alkanes. By an extended triol is meant the reaction product having terminal hydroxyl groups of the triol and a suitable reactant, e.g., an alkyl oxide or a lactone. Typical lactone extended trimethylol alkanes include -caprolactone extended trimethylol methane, ε-caprolactone extended trimethylol ethane, ε-caprolactone extended trimethylol propane, and ε-caprolactone extended trimethylol butane. Typical alkyl oxide extended triols include ethylene oxide extended trimethylol methane, ethylene oxide extended trimethylol ethane, ethylene oxide extended trimethylol propane, ethylene oxide extended trimethylol butane, propylene oxide extended trimethylol methane, propylene oxide extended trimethylol methane, propylene oxide extended trimethylol ethane, propylene oxide extended trimethylol butane.

The preferred polyols meeting these requirements have the general formula $R_4(OH)_n$ where n is greater than 2 up to about 8 and generally is about 3. $R_4$ can be

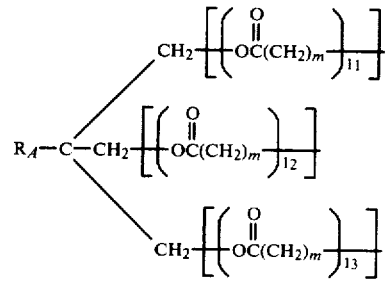

where $R_A$ is H, $-CH_3$, $-CH_2CH_3$, $-CH_2CH_2CH_3$, or $-CH_2CH_2CH_3$, and $l_1$, $l_2$ and $l_3$ are each integers from 0 to 5 and the sum of $l_1+l_2+l_3$ is 2 or more and generally from 2 to 8, although values as high as 15 are possible. The value of m depends on the lactone utilized to extend the polyol and is generally 4 or 5.

The chain extending lactone may be a delta lactone having the formula

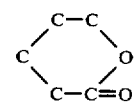

which can be substituted with hydrogen, methyl groups, or ethyl groups.

According to a still further exemplification, the chain extending lactone group can be an epsilon lactone having the formula:

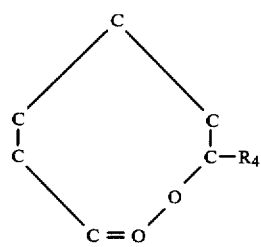

where $R_4$ is hydrogen, a methyl group, or an ethyl group and where $R_2$ can be on any of the carbons other than the carbonyl carbon. One exemplary triol is Union Carbide Corporation NIAX ® PCP-0301 brand epsilon-caprolactone extended trimethylol propane.

According to a still further exemplification, $R_4$ can be

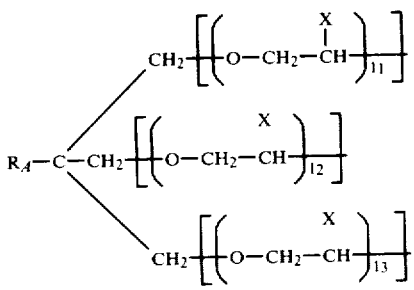

where $R_A$ is as defined previously, $l_1$, $l_2$ and $l_3$ are integers from 0 to 5 and the sum of $l_1+l_2+l_3$ is 2 or more and generally from about 2 to 8, although values as high as about 15 are possible, and X is H or $CH_3$. The chain extenders may be ethylene oxide groups as exemplified by Upjohn ISONOL ® 93 ethylene oxide extended trimethylol propane. Alternatively, the extenders may be propylene oxide groups as in BASF-Wyandotte PLURACOL TP brand propoxylated trimethylol propane.

According to a still further exemplification, $R_4(OH)_3$ may be an extended glycerol, for example, ethylene oxide extended glycerol having the general formula:

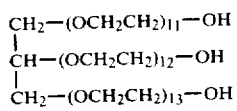

or propylene oxide extended glycerol having the formula:

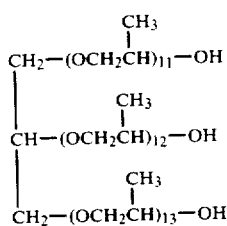

or a lactone extended glycerol having the formula:

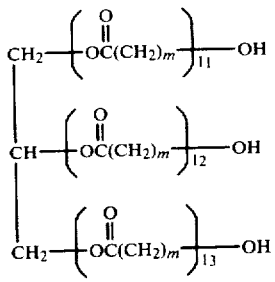

where m and $l_1$, $l_2$, and $l_3$ are as defined above. Typical propoxylated glycerines include DOW VORANOL 2025 brand propoxylated glycerine having a molecular weight of about 260 grams per gram mole, DOW VORANOL 2070 brand propoxylated glycerine having a molecular weight of about 700 grams per gram mole, and BASF-Wyandotte PLURACOL GP730 brand propoxylated glycerine having a molecular weight of about 730 grams per gram mole.

The polymerization of the polyol(allyl carbonate) composition is initiated by the creation of active centers, e.g., free radicals. Useful polymerization initiators are organic peroxy initiators. The organic peroxy polymerization initiators include: isobutyryl peroxide; di(2-ethylhexyl) peroxydicarbonate; acetyl cyclohexane sulfonyl peroxide; di(sec-butyl) peroxydicarbonate; diisopropyl peroxydicarbonate; 2,4-dichlorobenzoyl peroxide, t-butyl peroxypivalate; decanoyl peroxide; lauroyl peroxide, propionyl peroxide; 2,5-dimethyl-2,5-bis(2-ethyl hexylperoxy) hexane; acetyl peroxide; succinic acide peroxide; t-butyl peroxyoctoate; benzoyl peroxide; p-chlorobenzoyl peroxide; t-butyl peroxyisobutyrate; t-butyl peroxymaleic acid; bis(1-hydroxycyclohexyl) peroxide, 1-hydroxy-1'-hydroperoxy dicyclohexyl peroxide; t-butyl peroxyisopropyl carbonate; 2,5-dimethyl-2,5-bis(benzoylperoxy) hexane; t-butyl peroxyacetate; methyl ethyl ketone peroxides; di-t-butyl diperoxyphthalate and t-butyl peroxybenzoate.

According to the invention herein contemplated, the peroxy polymerization initiator comprises a first peroxide polymerization initiator, characterized by a short half life and a low initiation temperature, and a second organic peroxide polymerization initiator, characterized by a long half life and a high initiation temperature. It is to be understood that by short and long half lives, it is meant that at the same temperature, and in equivalent liquid, e.g., in the polyol(allyl carbonate) monomer, the half life of the second peroxy initiator is at least about five times longer than the half life of the first peroxy initiator, and preferably more than about eight to ten times longer. One particularly desirable peroxy polymerization initiator pair are diisopropyl peroxydicarbonate and benzoyl peroxide, which are reported by Rodriquez, *Principles of Polymer Systems*, McGraw-Hill Book Company, New York, N.Y. (1970), at page 58, to have a ratio of the half life of benzoyl peroxide to the half life of diisopropyl peroxide, when measured at the same temperature within the range of 30 degrees Centigrade to 105 degrees Centigrade of about 20 to 1.

It is to be understood that by high and low ignition temperatures, it is meant that at the same half life, and in equivalent liquid, e.g., both in polyol bis(allyl carbonate) monomer, the ignition temperature of the second, high ignition temperature, long half life, peroxy initiator is at least about 15 degrees Centigrade higher than the ignition temperature of the first peroxy initiator; and preferably about 20, 25 or even 30 degrees higher than that of the first peroxy initiator. By ignition temperature is meant the temperature to obtain 50 percent decomposition in a specified time. Rodriquez, loc. cit. reports that for half lives of from about 0.01 hour to about 0.2 hour, the ignition temperature of benzoyl peroxide is about 20 to 35 degrees Centigrade higher than the ignition temperature of diisopropyl peroxy dicarbonate.

Preferably the second, long half life, high ignition temperature peroxy polymerization initiator has a half life 5 or more times longer than that of the first, short half life, low ignition temperature peroxy polymerization initiator, and an ignition temperature at least about 15 degrees Centrigrade, and preferably 20,25 or even 30 degrees higher than that of the first peroxy polymerization initiator at the same life.

Particularly desirable first, low ignition temperature, short half life polymerization initiators include isobutyryl peroxide; di(2-ethylhexyl) peroxydicarbonate; acetyl cyclohexane sulfonyl peroxide; di(sec-butyl) peroxy=dicarbonate; diisopropyl peroxydicarbonate; 2,4-dichlorobenzoyl peroxide; and t-butyl peroxypivalate.

Particularly desirable second, high ignition temperature, long half life polymerization initiators include 2,5-dimethyl-2,5-bis(2-ethyl hexanoylproxy) hexane; acetyl peroxide; succinic acid peroxide; t-butyl peroxyoctoate; benzoyl peroxide; p-chlorobenzoyl peroxide; t-butyl peroxyisobutyrate; t-butyl peroxymaleic acid; bis(1-hydroxycyclohexyl) peroxide; 1-hydroxy-1'-hydroperoxy dicyclohexyl peroxide; t-butyl peroxyisopropyl carbonate; 2,5-dimethyl-2,5-bis(benzoylperoxy) hexane; t-butyl peroxyacetate; methyl ethyl ketone peroxides; di-t-butyl diperoxyphthalate; t-butyl peroxybenzoate; n-butyl 4,4-bis(t-butylperoxy) valerate; 2,5-dimethyl-2,5-bis(t-butylperoxy) hexane; t-butyl hydroperoxide; 3,5-dimethyl-3,5-dihydroxy 1,2-peroxycyclopentane; di-t-butyl peroxide; 2,5-dimethyl-2,5-bis(t-butylperoxy) hexyne-3; and 1,1,3,3-tetramethylbutyl hydroperoxide.

Isopropyl peroxy dicarbonate is an exemplary first, short half life, low ignition temperature peroxy polymerization initiator. Benzoyl peroxide ant t-butyl peroxy isopropyl carbonate are exemplary high ignition temperature, long life peroxy polymerization initiators.

The following examples are illustrative.

EXAMPLE I

A series of tests were conducted to compare the photochromic properties of diethylene glycol bis(allyl carbonate) polymerizates containing tungsten hexacarbonyl as a photochromic agent with and without residual high ignition temperature, long half life, organic peroxide initiator.

Twenty-four sheets were cast. Each sheet was prepared by dissolving 0.1 weight percent, basis diethylene glycol bis(allyl carbonate), VENTRON CORPORATION tungsten hexacarbonyl, $W(CO)_6$ in PPG Industries, Inc. CR-39 ® diethylene glycol bis(allyl carbonate) monomer, at 80 to 90 degrees Centigrade. The diethylene glycol bis(allyl carbonate)-$W(CO)_6$ was divided into aliquot portions. To these portions were added ethylene glycol and dioctyl phthalate as mold release agents in the amount shown in Table II below. The monomer was then placed in a glass mold formed of two flat glass sheets separated by a one-eighth inch (3 millimeter) vinyl gasket. Organic peroxide polymerization initiator was added to each sample in the amount shown in Table II below. The samples were then heated in the airtight molds, according to the time-temperature program shown in Table I, below:

TABLE I

| Elapsed Time (hours) | Temperature, °C. |
|---|---|
| 0 | 42 |
| 4 | 44 |
| 6 | 45 |
| 8 | 47 |
| 10 | 48 |
| 12 | 50 |
| 14 | 52 |
| 16 | 54.5 |
| 18 | 57 |
| 20 | 61 |
| 22 | 69 |
| 23 | 79 |
| 23.6 | 84 |
| 24 | 98 |
| 24.1 | 100 |

Half of the samples were removed from the oven after curing to 84° C., the other half were fully cured to 100° C. The cured sheets were tested for fifteen second Barcol hardness.

The photochromic properties of the sheets were determined by placing the sheets on a turntable rotating at 4 revolutions per minute. A blacklamp mounted 10 inches above an edge of the table was connected to a timer which cycled it on for 3 hours, off for 3 hours, etc., during the period of exposure. The darkening and lightening rates, i.e., the percent transmission at 550 nanometers, were measured before placing the samples on the turntable with a Beckmann Model B Spectrophotometer. Then, after a number of days of exposure on the table under the cycling blacklamp followed by 3 days of recovery in darkness, the samples were again tested for darkening and lightening response. The exposure-recovery-test sequence was then repeated. Table II reports the results of this fatigue testing.

Typically, after approximately three hours total ultraviolet exposure, the sheets were placed in a dark drawer for at least 3 days per cycle and periodically removed for further 3 hour photochromic testing. This was continued for 120 days.

The sheets with only diisopropylperoxy dicarbonate were characterized by the build up of nonreversible color. The sheets with t-butyl peroxy isopropyl carbonate were characterized by significantly less nonreversible color.

TABLE II

EFFECT OF HIGH TEMPERATURE, LONG HALF LIFE ORGANIC PEROXIDE ON PHOTOCHROMIC PROPERTIES TRANSMISSION

| SAMPLE DESCRIPTION Release Agent | | Barcol Hardness 15 second | Percent Transmission (550 NM) | | | | | Percent Transmission Change (550 NM) 16 Hr. Dark Recovery | | FATIGUE TESTING (Percent Transmission) | | | | |
|---|---|---|---|---|---|---|---|---|---|---|---|---|---|---|
| Ethylene Glycol Wt. % | Dioctyl phthlate (wt. percent) | | Blacklamp Exposure | | Recovery in dark | | 16 Hr. UV Exp. | | | Initial Transmission | | Transmission After 50 Minutes Ultraviolet Exposure | | Transmission After 16 Hours In Dark |
| | | | Orig. | 5 Min. | 50 Min. | 3 Min. | 100 Min. | | | 6 days | 15 days | 30 days | 60 days | 120 days |
| Initiator: 4.5 weight percent diisopropyl peroxy dicarbonate | | | | | | | | | | | | | | |
| a. 84° C. cure temperature | | | | | | | | | | | | | | |
| 0 | 0.1 | 31–25 | 89 | 80 | 66 | 67 | 71 | 82 | −23 +16 | | | | | |
| 0 | 0.2 | 30–24 | 90 | 81 | 62 | 63 | 69 | 80 | −28 +18 | | | | | |
| 0 | 0.4 | 28–22 | 89 | 81 | 70 | 71 | 78 | 83 | −19 +13 | | | | | |
| 0.05 | 0.05 | 31–25 | 89 | 81 | 67 | 68 | 73 | 85 | −22 +18 | 35/28/35 | 30/25/30 | 28/23/28 | 27/23/27 | 28/23/28 |
| 0.1 | 0.1 | 29–22 | 89 | 80 | 65 | 66 | 72 | 84 | −24 +19 | | | | | |

TABLE II-continued
EFFECT OF HIGH TEMPERATURE, LONG HALF LIFE ORGANIC PEROXIDE ON PHOTOCHROMIC PROPERTIES TRANSMISSION

| SAMPLE DESCRIPTION Release Agent | | Barcol Hardness 15 second | Percent Transmission (550 NM) | | | | | | Percent Transmission Change (550 NM) | | FATIGUE TESTING (Percent Transmission) | | | | |
|---|---|---|---|---|---|---|---|---|---|---|---|---|---|---|---|
| Ethylene Glycol Wt. % | Dioctyl phthlate (wt. percent) | | Blacklamp Exposure | | Recovery in dark | | | | 16 Hr. Dark Recovery | | Initial Transmission | | Transmission After 50 Minutes Ultraviolet Exposure | | Transmission After 16 Hours In Dark |
| | | | Orig. | 5 Min. | 50 Min. | 3 Min. | 100 Min. | 16 Hr. | 16 UV Exp. | | 6 days | 15 days | 30 days | 60 days | 120 days |
| 0.2 | 0.2 | 29–23 | 89 | 78 | 63 | 64 | 71 | 83 | −26 | +20 | | | | | |
| b. 100° C. cure temperature | | | | | | | | | | | | | | | |
| 0 | 0.1 | 31–25 | 87 | 77 | 59 | 59 | 60 | 65 | −28 | +6 | | | | | |
| 0 | 0.2 | 32–26 | 87 | 78 | 58 | 58 | 59 | 63 | −29 | +5 | | | | | |
| 0 | 0.4 | 28–22 | 87 | 79 | 58 | 58 | 59 | 62 | −29 | +4 | 37/31/35 | 31/25/30 | 28/25/28 | 28/25/28 | 28/25/28 |
| 0.05 | 0.05 | 31–24 | 87 | 78 | 56 | 56 | 57 | 62 | −31 | +6 | | | | | |
| 0.1 | 0.1 | 31–24 | 87 | 78 | 57 | 57 | 58 | 62 | −30 | +5 | | | | | |
| 0.2 | 0.2 | 30–24 | 87 | 77 | 54 | 55 | 56 | 61 | −33 | +7 | | | | | |
| Initiator: 4.5 weight percent diisopropyl peroxy dicarbonate plus 1 weight percent t-butyl peroxy isopropyl carbonate | | | | | | | | | | | | | | | |
| a. 84° C. cure temperature | | | | | | | | | | | | | | | |
| 0 | 0.1 | 28–20 | 90 | 83 | 77 | 78 | 86 | 90 | −13 | +13 | | | | | |
| 0 | 0.2 | 28–19 | 91 | 83 | 77 | 78 | 85 | 91 | −14 | +14 | | | | | |
| 0 | 0.4 | 25–17 | 91 | 83 | 78 | 79 | 86 | 91 | −13 | +13 | 85/65/82 | 83/65/82 | 78/60/75 | 52/48/51 | 47/42/47 |
| 0.05 | 0.05 | 23–14 | 91 | 84 | 79 | 79 | 86 | 91 | −12 | +12 | | | | | |
| 0.1 | 0.1 | 24–16 | 90 | 83 | 77 | 78 | 86 | 90 | −13 | +13 | | | | | |
| 0.2 | 0.2 | 22–13 | 90 | 81 | 77 | 78 | 86 | 90 | −13 | +13 | | | | | |
| 100° C. cure temperature | | | | | | | | | | | | | | | |
| 0 | 0.1 | 29–22 | 88 | 81 | 70 | 70 | 77 | 82 | −18 | +12 | | | | | |
| 0 | 0.2 | 27–19 | 90 | 81 | 70 | 70 | 77 | 83 | −20 | +13 | 85/69/82 | 84/68/82 | 80/65/78 | 54/52/54 | 45/40/45 |
| 0 | 0.4 | 27–19 | 88 | 80 | 70 | 70 | 77 | 83 | −18 | +13 | | | | | |
| 0.05 | 0.05 | 27–18 | 88 | 81 | 70 | 70 | 76 | 81 | −18 | +11 | | | | | |
| 0.2 | 0.2 | 24–15 | 91 | 79 | 67 | 68 | 75 | 80 | −24 | +13 | | | | | |

EXAMPLE II

A series of sheets were polymerized from diethylene glycol bis(allyl carbonate) to determine the effect of a high ignition temperature, long half life organic peroxide polymeriation initiator.

Eight sheets were prepared. Each sheet was prepared by adding the amounts of diisopropyl peroxydicarbonate and benzoyl peroxide shown in Table III, below, to PPG Industries, Inc. CR-39 ® diethylene glycol bis(allyl carbonate). The monomer compositions were placed in molds formed by two glass sheets with a one-eighth inch (3 millimeter) vinyl gasket therebetween, and heated according to the time-temperature program shown in Table I of Example II, above.

The following results were obtained:

TABLE III
Effect of Benzoyl Peroxide on Diethylene Glycol Bis(Allyl Carbonate) Polymers Polymerized Below 100° C.

| Isopropyl Peroxydicarbonate Weight Percent | Benzoyl Peroxide Weight Percent | Barcol Hardness (0–15 second) |
|---|---|---|
| 4 | 0 | 31–25 |
| 3 | 0 | 26–20 |
| 2.5 | 0 | 17–9 |
| 1 | 0 | 0–0 |
| 3.5 | 0 | 30–25 |
| 2.5 | 1.5 | 33–27 |
| 1.5 | 2.5 | 33–27 |
| 0 | 3.5 | 0–0 |

EXAMPLE III

A series of specimens were polymerized from diethylene glycol bis(allyl carbonate) to determine the effect of a high ignition temperature, long half life organic peroxide polymerization initiator.

Ten samples were cast. Each sample was prepared by adding the amounts of diisopropyl peroxy dicarbonate and benzoyl peroxide shown in Table IV below, to PPG Industries, Inc. CR-39 ® diethylene glycol bis(allyl carbonate) monomer. The monomer compositions were placed in stoppered test tubes and polymerized according to the time-temperature program shown in Table I of Example I, above. Thereafter each sample of each composition was post-cured by heating to 121° C. for 2 hours. The following results were obtained:

TABLE IV
Effect of Benzoyl Peroxide and Post-Cure On Diethylene Glycol Bis(Allyl Carbonate) Polymerized Below 100° C. and Post-Cured Above 100° C.

| Isopropyl Peroxydicarbonate Weight Percent | Benzoyl Peroxide Weight Percent | Without Post-Cure Barcol Hardness (0–15 second) | With Post-Cure Barcol Hardness (0–15 second) |
|---|---|---|---|
| 3.5 | 0 | 33–26, 32–26 | 33–27, 32–26 |
| 1.5 | 2.0 | 27–20, 32–26 | 35–25, 35–28 |
| 1.25 | 2.25 | 30–23, 33–25 | 31–25, 34–29 |
| 1.0 | 2.5 | 30–22, 32–24 | 34–28, 34–28 |
| 0.75 | 2.75 | 29–20, 29–21 | 33–28, 34–29 |

Although this invention has been described in terms of specific details and embodiments, the description is not intended to limit the invention, the scope of which is defined in the following claims.

I claim:

1. In a method of polymerizing a polyol(allyl carbonate) having a photochromic agent incorporated therein, which method comprises adding a first organic peroxide initiator to the polyol(allyl carbonate) monomer and curing the polyol(allyl carbonate), the improvement comprising adding from about 1 to about 10 moles of a second organic peroxide initiator per mole of photochromic agent to the polyol(allyl carbonate), said second organic peroxide initiator having a half life at least five times greater than the half life of the first organic peroxide initiator.

2. The method of claim 1 wherein the first organic peroxide polymerization initiator is chosen from the group consisting of isobutyryl peroxide; di(2-ethylhexyl) peroxydicarbonate; acetyl cyclohexane sulfonyl peroxide; di(sec-butyl) peroxydicarbonate; diisopropyl peroxydicarbonate; 2,4-dichlorobenzoyl peroxide; and t-butyl peroxypivalate; and the second organic peroxide polymerization initiator is chosen from the group consisting of 2,5-dimethyl-2,5-bis(2-ethyl hexanoylproxy) hexane; acetyl peroxide; succinic acid peroxide; t-butyl peroxyoctoate; benzoyl peroxide; p-chlorobenzoyl peroxide; t-butyl peroxyisobutyrate; t-butyl peroxymaleic acid; bis(1-hydroxycyclohexyl) peroxide; 1-hydroxy-1'-hydroperoxy dicyclohexyl peroxide; t-butyl peroxyisopropyl carbonate; 2,5-dimethyl-2,5-bis(benzoylperoxy) hexane; t-butyl peroxyacetate; methyl ethyl ketone peroxides; di-t-butyl diperoxyphthalate; t-butyl peroxybenzoate; n-butyl 4,4-bis(t-butylperoxy) valerate; 2,5-dimethyl-2,5-bis(t-butylperoxy) hexane; t-butyl hydroperoxide; 3,5-dimethyl-3,5-dihydroxy 1,2-peroxycyclopentane; di-t-butyl peroxide; 2,5-dimethyl-2,5-bis(t-butylperoxy) hexyne-3; and 1,1,3,3-tetramethylbutyl hydroperoxide.

3. The method of claim 1 wherein the photochromic agent is an organo metallic.

4. The method of claim 3 wherein the photochromic agent is a transition metal carbonyl.

5. The method of claim 4 wherein the transition metal carbonyl is tungsten hexacarbonyl.

6. The method of claim 1 wherein the polyol(allyl carbonate) is a diol bis(allyl carbonate).

7. A liquid composition comprising a polyol bis(allyl carbonate), a photochoromic agent, a first organic peroxide initiator, and from about one to about ten moles of a second organic peroxide initiator per mole of photochromic agent, said second organic peroxide initiator having a half life at least five times longer than the half life of the first organic peroxide initiator.

8. The liquid composition of claim 7 wherein the first organic peroxide polymerization initiator is chosen from the group consisting of isobutyryl peroxide; di(2-ethylhexyl) peroxydicarbonate; acetyl cyclohexane sulfonyl peroxide; di(sec-butyl) peroxydicarbonate; diisopropyl peroxydicarbonate; 2,4-dichlorobenzoyl peroxide; and t-butyl peroxypivalate; and the second organic peroxide polymerization initiator is chosen from the group consisting of 2,5-dimethyl-2,5-bis(2-ethyl hexanoylproxy) hexane; acetyl peroxide; succinic acid peroxide; t-butyl peroxyoctoate; benzoyl peroxide; p-chlorobenzoyl peroxide; t-butyl peroxyisobutyrate; t-butyl peroxymaleic acid; bis(1-hydroxycyclohexyl) peroxide; 1-hydroxy-1'-hydroperoxy dicyclohexyl peroxide; t-butyl peroxyisopropyl carbonate; 2,5-dimethyl-2,5-bis(benzoylperoxy) hexane; t-butyl peroxyacetate; methyl ethyl ketone peroxides; di-t-butyl diperoxyphthalate; t-butyl peroxybenzoate; n-butyl 4,4-bis(t-butylperoxy) valerate; 2,5-dimethyl-2,5-bis(t-butylperoxy) hexane; t-butyl hydroperoxide; 3,5-dimethyl-3,5-dihydroxy, 1,2-peroxycyclopentane; di-t-butyl peroxide; 2,5-dimethyl-2,5-bis(t-butylperoxy) hexyne-3; and 1,1,3,3-tetramethylbutyl hydroperoxide.

9. The liquid composition of claim 7 wherein the photochromic agent is an organo metallic.

10. The liquid composition of claim 9 wherein the photochromic agent is a transition metal carbonyl.

11. The liquid composition of claim 9 wherein the transition metal carbonyl is tungsten hexacarbonyl.

12. The liquid composition of claim 7 wherein the polyol(allyl carbonate) is a diol bis(allyl carbonate).

13. A method of enhancing the recovery of an organic peroxide free radical initiated polyol(allyl carbonate) polymerizate having a photochromic agent incorporated therein, which method comprises adding from about one to about ten moles of a second organic peroxide free radical initiator per mole of photochromic agent to the composition of polyol(allyl carbonate) monomer, photochromic agent, and first organic peroxide free radical initiator, which second organic peroxide free radical initiator has a half life at least five times longer than the half life of the first organic peroxide free radical initiator.

14. The method of claim 13 wherein the first organic peroxide polymerization initiator is chosen from the group consisting of isobutyryl peroxide; di(2-ethylhexyl) peroxydicarbonate; acetyl cyclohexane sulfonyl peroxide; di(secbutyl) peroxydicarbonate; diisopropyl peroxydicarbonate; 2,4-dichlorobenzoyl peroxide; and t-butyl peroxypivalate; and the second organic peroxide polymerization initiator is chosen from the group consisting of 2,5-dimethyl-2,5-bis(2-ethyl hexanoylproxy) hexane; acetyl peroxide; succinic acid peroxide; t-butyl peroxyoctoate; benzoyl peroxide; p-chlorobenzoyl peroxide; t-butyl peroxyisobutyrate; t-butyl peroxymaleic acid; bis(1-hydroxyclcylohexyl) peroxide; 1-hydroxy-1'-hydroperoxy dicyclohexyl peroxide; t-butyl peroxyisopropyl carbonate; 2.5-dimethyl-2,5-bis(benzoylperoxy) hexane; t-butyl peroxyacetate; methyl ethyl ketone peroxides; di-t-butyl diperoxyphthalate; t-butyl peroxybenzoate; n-butyl 4,4-bis(t-butylperoxy) valerate; 2,5-dimethyl-2,5-bis(t-butylperoxy) hexane; t-butyl hydroperoxide; 3,5-dimethyl-3,5-dihydroxy 1,2-peroxycyclopentane; di-t-butyl peroxide; 2,5-dimethyl-2,5-bis(t-butylperoxy) hexyne-3; and 1,1,3,3-tetramethylbutyl hydroperoxide.

15. The method of claim 13 wherein the photochromic agent is an organo metallic.

16. The method of claim 15 wherein the photochromic agent is a transition metal carbonyl.

17. The method of claim 16 wherein the transition metal carbonyl is tungsten hexacarbonyl.

18. The method of claim 13 wherein the polyol(allyl carbonate) is a diol bis(allyl carbonate).

19. In a method of polymerizing a polyol(allyl carbonate) having a photochromic agent incorporated therein, which method comprises adding a first organic peroxide initiator to the polyol(allyl carbonate) monomer and curing the polyol(allyl carbonate), the improvement comprising adding second and third organic peroxide initiators to the polyol(allyl carbonate), said second organic peroxide initiator having a half life at least five times longer than the half life of the first organic peroxide initiator, and said third organic peroxide initiator having a half life at least five times longer than the half life of said second organic peroxide initiator and being present at a concentration of about one to about ten moles per mole of photochromic agent.

20. The method of claim 2 wherein the photochromic agent is an organo metallic.

21. The method of claim 20 wherein the photochromic agent is a transition metal carbonyl.

22. The method of claim 21 wherein the transition metal carbonyl is tungsten hexacarbonyl.

23. The method of claim 19 wherein the polyol(allyl carbonate) is a diol bis(allyl carbonate).

24. A liquid composition comprising a polyol bis(allyl carbonate), a photochromic agent, a first peroxide initiator, a second peroxide initiator, and about one to ten moles of a third organic peroxide initiator per mole of photochromic agent, said second organic peroxide initiator having a half life at least about five times longer than the half life of the frist organic peroxide initiator, and said third organic peroxide initiator having a half life at least about five times longer than the half life of said second organic peroxide initiator.

25. The liquid composition of claim 24 wherein the photochromic agent is an organo metallic.

26. The liquid composition of claim 25 wherein the photochromic agent is a transition metal carbonyl.

27. The liquid composition of claim 25 wherein the transition metal carbonyl is tungsten hexacarbonyl.

28. The liquid composition of claim 24 wherein the polyol(allyl carbonate) is a diol bis(allyl carbonate).

29. A method of increasing the hardness and enhancing the photochromic recovery of an organic peroxide free radical initiated polyol(allyl carbonate) polymerizate having a photochromic agent incorporated therein, which method comprises adding second and third organic peroxide free radical initiators to the composition of polyol (allyl carbonate) monomer, photochromic agent, and first organic peroxide free radical initiator, which second free radical organic peroxide initiator has a half life at least about five times longer than the half life of the first free radical organic peroxide initiator, and which third free radical organic peroxide initiator has a half life at least about five times longer than the second free radical organic peroxide initiator, said third organic peroxide free radical initiator being present at a concentration of about one to about ten mole per moles of photochromic agent.

30. The method of claim 29 wherein the photochromic agent is an organo metallic.

31. The method of claim 30 wherein the photochromic agent is a transition metal carbonyl.

32. The method of claim 31 wherein the transition metal carbonyl is tungsten hexacarbonyl.

33. The method of claim 29 wherein the polyol(allyl carbonate) is a diol bis(allyl carbonate).

* * * * *